Dec. 9, 1958   B. GORDON ET AL   2,863,678
COUPLING FOR DOUBLE-FLARED TUBES
Filed Dec. 27, 1955
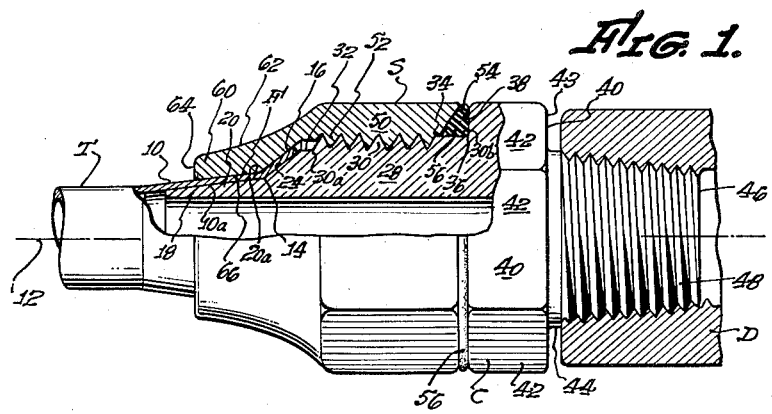
BENJAMIN GORDON,
LYSLE E. SOMERS,
INVENTORS.
BY William C. Babcock
ATTORNEY.

United States Patent Office 2,863,678
Patented Dec. 9, 1958

2,863,678

COUPLING FOR DOUBLE-FLARED TUBES

Benjamin Gordon and Lysle E. Somers,
Los Angeles, Calif.

Application December 27, 1955, Serial No. 555,610

4 Claims. (Cl. 285—332.1)

The present invention relates generally to the field of couplings, and more particularly to a coupling adapted to removably effect multiple fluid-tight seals between adjacent flared end portions of tubing. This application is a continuation-in-part of an application filed in the United States Patent Office by Lysle E. Somers and Benjamin Gordon on February 19, 1951, entitled Pipe Coupling, Serial No. 211,654, now abandoned.

A major object in devising the present invention is to provide a coupling especially adapted for removably joining adjacent ends of deformable, resilient tubing, which are so constructed that the coupling can be taken apart for inspection purposes and reassembled without doing damage to the coupling or tubing.

Another object of the invention is to provide a tubing coupling embodying a plurality of sealing surfaces that are effective in preventing leakage of fluid, with at least two of the seals being of the metal-to-metal type.

A further object of the invention is to provide a pipe coupling which, in addition to comprising two metal-to-metal surfaces, is provided with an additional seal of deformable material which is effective to both aid in preventing leakage outwardly through the coupling and to prevent moisture in the atmosphere from working into said coupling and so avoid loosening of or damage to the coupling by the formation of ice when the coupling is subjected to low temperatures.

Yet another object of the invention is to provide a coupling for tubing in which the establishment of a secondary seal also results in the formation of a stop that prevents the flared end of a tube from being distorted beyond the elastic limit of the metal forming the tube.

A further object of the invention is to provide a coupling that requires the expenditure of relatively little force in making up the coupling to secure a fluid-tight seal between the flared tubing end portion and that part of the coupling member engaged thereby.

These and other objects and advantages of the invention will become apparent from the following description of a preferred form thereof, and from the drawing illustrating that form, in which:

Figure 1 is a vertical cross-sectional view of the coupling and tubing showing the coupling and tubing joined to one another by a plurality of liquid-tight seals;

Figure 2 is a fragmentary vertical cross-sectional view of the upper portion of the flared end of a tube shown as the flared end is moved toward a sealing position with the coupling member by movement of a suitable nut;

Figure 3 is a fragmentary vertical cross-sectional view of the upper portion of the flared end of a tube after it has engaged and effected a primary seal with the male portion of a coupling member showing the extremity of the flared end just as it has contacted an inwardly disposed portion of the coupling member prior to effecting a fluid-tight seal therewith;

Figure 4 is a fragmentary vertical cross-sectional view of the upper portion of the flared end of a tube after it has been forced inwardly on a coupling member to effect both a primary and a secondary fluid seal therewith, with a third seal formed on the exterior surface of the coupling member at the time the secondary seal is effected; and Figure 5 is a fragmentary vertical cross-sectional view of an alternate form of the invention.

Referring now to the drawing for the general arrangement of the invention, it will be seen that a coupling member C and sleeve S are provided that permit a tube T having a compound flare F formed on one end portion thereof to be removably connected to a fluid-containing device D which communicates with the end of coupling member C opposite that on which flare F is mounted.

Tube T is preferably of a thin-walled construction, and is formed of a material that is resilient yet is adapted to withstand sudden shock, such as stainless steel. As shown in the drawing, flare F has a first portion 10 that tapers forwardly and outwardly relative to the centerline 12 of the tube. The taper of the interior surface 10a of flare portion 10 relative to centerline 12 should be an angle A that does not exceed 22°, for reasons that will be explained in detail hereinafter. The flared portion 10, which is of annular transverse cross section, terminates in a circumferentially extending junction line 14, from which a second flared portion 16 extends forwardly and outwardly. It will be seen that the angle B sustained between the interior surface of flare portion 16 and the longitudinal centerline 12 of tube T is considerably greater than angle A.

Flare F removably seals on the exterior surfaces of a male tubular member 18 forming one of the end portions of coupling C. Member 18 is of annular transverse cross section and includes an outwardly disposed portion 20 having an exterior surface 20a that tapers at the same angle A relative to centerline 12 as that of flare surface 10a. The length of surface 20a is such that junction line 14 of flare F, and a circumferentially extending junction line 22 which defines the inward termination of surface 20a are not in transverse alignment at the time surfaces 10a and 20a effect a fluid-tight primary seal with one another, as shown in Figure 3. Instead, the two junction lines 14 and 22 are actually separated from one another by a longitudinal distance L as shown in this figure. The importance of this longitudinal distance L will later be discussed in detail.

Male member 18 is formed with a second annular tapered surface 24 that originates at junction line 22 and sustains an angle E with centerline 12. The angle E is considerably greater than angle A, but only slightly greater than angle B for reasons to be described hereinafter. Tapered surface 24 terminates in a circumferentially extending line 26 that defines one outwardly disposed end of a cylindrical body 28 having threads 30 formed on the exterior surface thereof. Body 28 has a first plain exterior portion 32 that extends from line 26 to the outer edge 30a of threads 30. The body 28 also has a second plain exterior surface 30b leading from the inner edge 34 of threads 30 to a circumferentially extending line 36 from which a first side 38 of a nut 40 projects. Nut 40 is formed with a plurality of flat faces 42 of such size and configuration as to permit easy engagement thereof by a hand wrench, which nut has a second side 43 that is longitudinally spaced from side 38 and parallel thereto. Side 43 extends inwardly toward centerline 12 to terminate in a circular line 44 from which a second male member 46 projects that is provided with threads 48 on the exterior surface thereof.

The sleeve S has a first portion 50 in the form of a cylindrical shell having threads 52 formed on the interior surface thereof. Sleeve portion 50 is shaped to provide an annular, tapered seat 54 that may be disposed adjacent to the face 38 of nut 40. When a resilient ring 56 is positioned between seat 54 and face 38, and the sleeve S tightened, ring 56 is compressed and serves as the third fluid seal previously mentioned.

This third fluid seal is not necessary for all installations in which the invention is used, but is highly advantageous in those installations where water or moisture has access to the space between the coupling member C and sleeve S. Should such moisture or water be permitted to enter this space and subsequently freeze therein, sleeve S may be broken due to the expansion of the water or moisture as it is transformed to ice, or at the very least, the transverse cross section of the sleeve would be increased. It will be obvious that a succession of such freezing actions will so increase the transverse cross section of sleeve S as to render it incapable of snugly engaging the coupling member C, whereby the coupling could not be used to effect a fluid-tight junction with tubing T.

Sleeve S also includes a second portion 60 of somewhat irregular transverse cross section, as may best be seen in Figure 2. This second portion is defined by a slightly concave, cylindrical exterior surface 62 that terminates in a ring-shaped surface 64 disposed normally to centerline 12. Surface 64 extends inwardly toward centerline 12 to define a circular edge 64a comprising the outer boundary of a tapered, cylindrical surface 66. Surface 66 tapers at an angle A relative to centerline 12, and is of such diameter as to engage the exterior surface 10b of that part of flare portion 10 disposed adjacent junction line 14. In Figures 3 and 4 it will be seen that the length of surface 66 is considerably less than that of the surface of flare portion 10b which it removably engages. Surface 66 terminates in a circumferential line 68 that serves as the boundary of one end of a forwardly and outwardly extending tapered surface 70 which is preferably formed at an angle relative to centerline 12 substantially equal to that of angles B or E.

In use the operation of the invention is extremely simple. Sleeve S is first slidably disposed on tubing T and the compound flare F is then formed on the end thereof as shown in the drawing. The apparatus utilized in forming flare F forms no part of the present invention, and hence is not described herein. It will be apparent that sleeve S may be slidably mounted on tubing T after flare F is formed, providing only one end of the tubing has a flare so formed thereon.

Next, sleeve S and flare F are caused to engage the coupling member C as shown in Figure 2. Due to the threaded construction of sleeve S and coupling member C, the sleeve is moved inwardly relative to the member when rotated in the appropriate direction. As sleeve S moves inwardly relative to coupling member C, it concurrently moves the flare F and tube T therewith. Free movement of flare F and tube T continues until the surface 10a seats on surface 20a, as shown in Figure 3, to effect a first fluid-tight seal therewith. It should be particularly noted that at the time the first fluid seal is effected, the inner circumferential edge 16a of second flare portion 16 is in initial contact with the second surface 24 of male member 18. Also it will be noted (Figure 3) that the junction lines 14 and 22 are separated by the longitudinal distance L.

Continued rotation of sleeve S results in a stretching of the metal forming the first flare portion 10, which stretching continues until junction lines 14 and 22 are in substantially vertical alignment, as shown in Figure 4. As flare portion 10 is moved inwardly and stretched, it exerts sufficient force on second flare portion 16 to deform the second flare portion within the elastic limits of the metal forming same so as to seat on surface 24 of male member 18 (Figure 4), and form a second fluid-tight seal therewith. Deformation beyond the elastic limits of second flare portion 16 is prevented as junction line portion 14 of the first flare portion abuts against junction line portion 22 of male member 18, which acts as a stop therefor.

As sleeve S is rotated to effect the second fluid-tight seal, the seat 54 thereof is advanced inwardly toward face 38 of nut 40 whereby the resilient ring 56 is gripped between the face and seat to effect a third fluid-tight seal.

Normally, this third fluid seal is only employed in those installations where it is possible for water or moisture to enter between sleeve S and coupling member C, in which instances such moisture may turn to ice when subjected to low temperatures. As water or moisture is transformed to ice it expands, and in so doing also expands the sleeve S sufficiently to impair its fluid-sealing characteristics. When it is desired to dismantle the coupling, the operations described above are simply reversed.

Under some conditions a coupling is subjected to severe vibration. The adverse effect of such vibrations on the present invention is minimized by making the male member 18 long enough for it to extend outwardly beyond the extremity 64 of sleeve member S as shown in Figure 4. This increased length of male member 18 adds sufficient rigidity to flare F to prevent the setting up of a vibration point within the length thereof.

The alternate form of the invention shown in Figure 5 differs in structure from the previously described preferred form only in the taper provided on the tubing T.

The flare F' formed on the end portion of tubing T' includes a first portion 10' that tapers forwardly and outwardly relative to the center line 12' of the tubing. First flare portion 10' develops into a second annular flared portion 16' that also extends forwardly and outwardly. Second flared portion 16' has a convex interior face 16a and a concave exterior face 16b. The rearwardly disposed extremities of faces 16a and 16b are tangent to the forwardly situated extremities of interior face 10a and exterior face 10b respectively of first flare portion 10'.

The curvature of second flared portion 16' is such that the outer circumferential extremity 80 thereof contacts the surface 70' of sleeve S' before a primary seal is effected between surfaces 10'a and 20'a. As sleeve S' is screwed inwardly on coupling C', the second flared portion 16' due to contact of extremity 80 with surface 70' moves the first flared portion 10' inwardly to place tension thereon after surfaces 10'a and 20'a are in fluid-sealing contact. As sleeve S' is screwed inwardly on coupling C' after effecting a seal between surfaces 10a and 20a, it engages extremity 80 of second flared portion 16' and forces a circumferentially extending portion 82 thereof into fluid-sealing engagement with the second annular tapered surface 24'.

The material forming the flare F' possesses some resilience and is deformable to some extent. Sleeve S' deforms second flared portion 16' when it is in fluid-sealing contact with tapered surface 24'. The deformed second flared portion 16' tends to return to its non-deformed shape as soon as pressure is removed therefrom, and the second flared portion in so doing moves outwardly from surface 24'. Second flared portion 16' in so moving outwardly also moves first flared portion 10' outwardly therewith, and as a result there is no possibility of the first flared portion 10' binding on surface 20'a when sleeve S' is unscrewed from coupling C'.

Although the coupling herein shown and described is fully capable of achieving the objects and providing the advantages hereinbefore described, it is to be understood that it is merely the presently preferred embodiment of our invention and that we do not mean to be limited to the details of construction herein shown and described other than as defined in the appended claims.

We claim:

1. A tube coupling capable of effecting first and second independent fluid seals with first and second consecutive flared end sections of a resilient metallic tube that progressively increases in internal diameter, including: a tubular coupling body comprising a tubular member defined by first and second frusto-conical exterior surface portions that are separated by a circumferentially extending junction line of slightly greater diameter than that of the junction line between said first and second flared end sections, said first exterior surface portion being tapered at substantially the same angle as that of the interior surface of said first flared end section; a sleeve formed with a first frusto-conical interior face that tapers at substantially the same angle as the exterior surface of said first flared end section, with said first face extending inwardly from one end of said sleeve and terminating in a transverse, circumferentially extending junction line of lesser diameter than the external diameter of said junction line between said first and second flared end sections, and a second circumferentially extending interior face of greater angulation than said first face but of slightly greater angulation than the initial angulation of the interior surface of said second flared end section that extends inwardly therefrom into said sleeve; and connecting means for joining said tubular body and sleeve and effecting relative movement therebetween, which sleeve when moved inwardly by said means relative to said body first forces the interior surface of said first end section into slidable fluid sealing contact with said first face of said sleeve, and after said first seal is effected continues to move said first end section relative to said first face to force said second flared end section into independent sealing contact with said second surface portion.

2. A tube coupling as defined in claim 1 wherein said connecting means are rotatably engageable threads formed on a portion of the exterior surface of said coupling body and a portion of the interior surface of said sleeve.

3. A tube coupling as defined in claim 2 wherein the interior diameter of the junction line between said first and second end sections and the diameter of said junction line between said first and second surface portions are so related that said sleeve can move said flared end sections to align both of said junction lines in a common plane without permanent deformation of said resilient metal, with said second section being in full sealing engagement with said second face only after said first section and said first face are in full sealing engagement and when said alignment of said junction lines is achieved, said second section when in said full sealing engagement with said second face serving as a stop to prevent further inward movement of said flared end sections relative to said coupling body.

4. A coupling for effecting multiple independent fluid seals with a preformed compound flare formed in an end portion of a metallic resilient tube defined by a first inwardly disposed frusto-conical section and a second outwardly disposed frusto-conical section that progressively increase in internal diameter and are separated by a first circumferentially extending junction line, comprising: a tubular coupling body which includes a first male tubular member defined by first and second frusto-conical exterior surface portions that are separated by a second circumferentially extending junction line of slightly greater diameter than said first junction line, said first surface portion being of substantially the same configuration as the interior surface of said first section but slightly greater in length, said second surface portion being of substantially the same configuration as the interior surface of said second section but disposed at a slightly wider angle relative to the longitudinal axis of said body than that of the interior surface of said second section relative to the longitudinal axis of said tubing, with said body having first threads formed on the exterior thereof inwardly from said second surface portion; and a sleeve having second threads formed on one interior end portion thereof, a first frusto-conical face formed on the opposite interior end portion of said sleeve that tapers at substantially the same angle as that of the exterior surface of said first section and adapted to engage same, but the maximum diameter of said face being substantially less than that of said first junction line, with a second circumferentially extending face formed on the interior of said sleeve that extends between the inwardly disposed extremities of said first face and said threaded end portion a greater distance than the length of said second surface portion, with said sleeve when said flare is disposed within the confines thereof and engagingly rotated relative to said first threads moving said first section by contact with said first face into fluid sealing contact with said first surface portion, with continued rotation of said sleeve stretching said first section within the elastic limits of said metal defining same to dispose said first and second junction lines in a common plane with said second section during said stretching and contacting said second surface portion to deform outwardly and fully contact said second surface and act as a second fluid seal and stop to further inward movement of said flare relative to said male member.

References Cited in the file of this patent

UNITED STATES PATENTS

| | | |
|---|---|---|
| 196,084 | Guyer | Oct. 16, 1877 |
| 196,904 | Ingersoll | Nov. 6, 1877 |
| 654,735 | Jordan | July 31, 1900 |
| 1,680,080 | Benzion | Aug. 7, 1928 |
| 1,718,662 | Oakley | June 25, 1929 |
| 1,838,180 | Hitchcock | Dec. 29, 1931 |
| 1,949,668 | Weatherhead | Mar. 6, 1934 |
| 2,011,433 | Blagg | Aug. 13, 1935 |
| 2,290,890 | Parker | July 28, 1942 |

FOREIGN PATENTS

| | | |
|---|---|---|
| 416,733 | Great Britain | Sept. 20, 1934 |